UNITED STATES PATENT OFFICE.

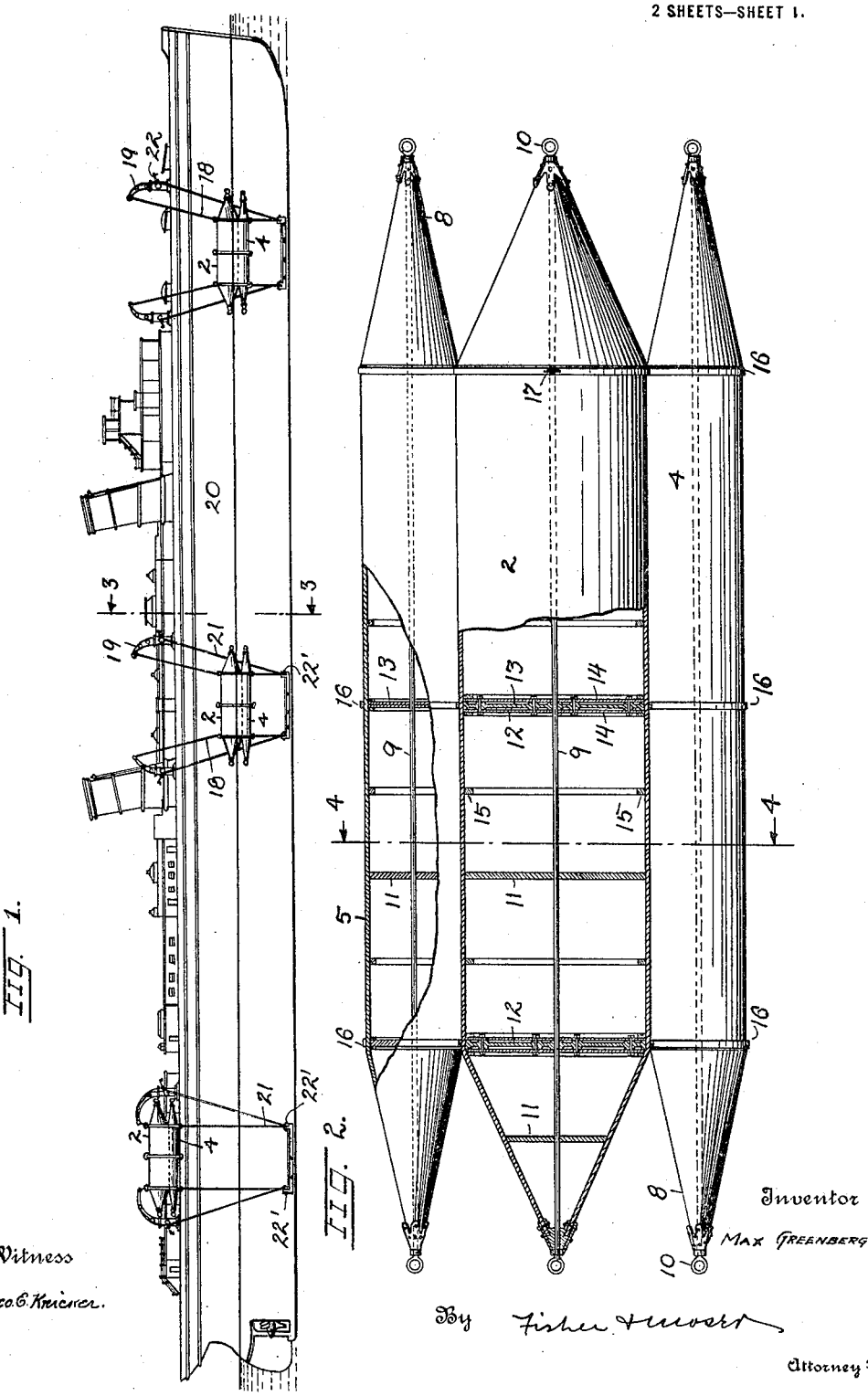

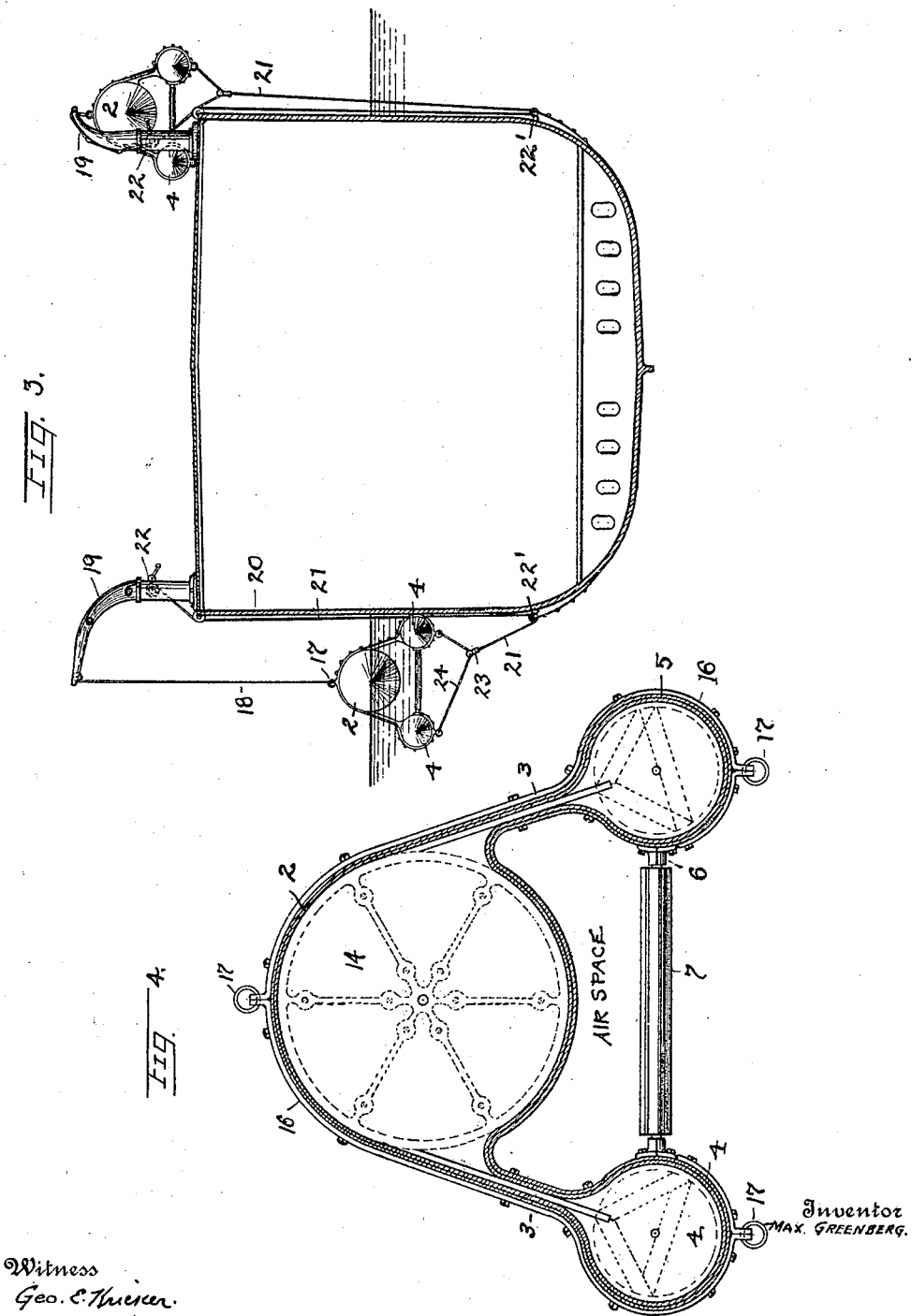

MAX GREENBERG, OF CLEVELAND, OHIO.

SAFEGUARD FOR VESSELS.

1,318,142.  Specification of Letters Patent.  Patented Oct. 7, 1919.

Application filed February 23, 1918. Serial No. 218,839.

*To all whom it may concern:*

Be it known that I, MAX GREENBERG, citizen of the United States, residing at Cleveland, in the county of Cuyahoga and State of Ohio, have invented certain new and useful Improvements in Safeguards for Vessels, of which the following is a specification.

This invention relates to safeguards for vessels, the object being to provide a set of floats or buoys of a size and character to buoy the vessel in a greater or less degree upon lowering said floats and securing them to the sides of the vessel by means operable from the deck of the vessel.

The invention would be of especial utility in connection with a torpedoed vessel to either prevent the vessel from sinking altogether or to retard its sinking, and the invention may also be used to overcome listing of the vessel or to trim the vessel and may also be used to ward or fend off a torpedo or to receive the impact from a torpedo. The invention may also be utilized as a life raft for the occupants of the sinking vessel and it may also be utilized in building a pontoon bridge or wharf from the shore to the vessel.

In the accompanying drawings, Figure 1 is a side view of a vessel equipped with my invention. Fig. 2 is a plan view, partly in section, of one of my improved buoys or floats. Fig. 3 is a cross section of a vessel enlarged over Fig. 1 showing one of the buoys in lowered position and another buoy raised to the upper deck of the vessel. Fig. 4 is an enlarged cross section on line 4—4, Fig. 2.

The buoy or float comprises a relatively large hollow cylinder 2 united by webs 3 to two smaller hollow cylinders 4 and 5 and which smaller cylinders are spaced apart and rigidly secured together by braces 6 carrying rollers 7. The respective cylinders have pointed ends 8 and a central tie rod 9 extends through each cylinder from end to end thereof and each end of the rod has an eye 10 adapted to fasten a cable or other line thereto. Each cylinder is also provided with bulkheads or partitions 11 and 12, the bulkheads 12 being a composite structure; that is, built up of a central metal disk 13 faced on opposite sides with wood 14. The walls of each cylinder are also preferably made of wood covered with waterproof material, and the partitions 11 are preferably of wood, and reinforcing rings 15 of wood are also used to strengthen the walls of each cylinder, the whole being made relatively as light and strong as possible. Rigidity and strength is also given to the buoy by encircling the cylinders with metal straps 16 opposite the periphery of the metal disks 13. The straps 16 are united by rings 17 at their meeting ends centrally above the larger cylinder 2 and centrally beneath the bottom of the smaller cylinders 4 and 5, and a pair of steel cables 18 connect with the upper rings 17 to elevate and lower the buoy from davits 19 mounted on an upper deck of the vessel 20. A second set of cables 21 passes from the winch 22 at the davits to and around a sheave 22' secured to the side of the vessel beneath the water line and near the bottom of the vessel, and cable 21 has a sheave 23 at its end in running engagement with a cable 24 which is connected at its opposite ends with the rings 17 at the bottom of the cylinders 4 and 5. This arrangement of cables is the same at the opposite ends of the cylinders, and when the winch 22 is operated either manually or by a motor or engine, the buoy may be lowered into the water at the sides of the ship and carried beneath the surface of the water to a greater or less depth within limits as determined by the position of the sheave 22' secured to the side of the vessel.

Briefly, the means described permit the buoy to be lowered and also drawn beneath the surface of the water. The lift or power obtained by this displacement is applied to the vessel at sheave 22', thereby materially effecting the list to port or starboard of the vessel, depending upon whether the float or floats at one side or the other of the vessel are lowered. Given a sufficient number of such buoys, it is possible to list the boat to bring any opening or injury in one side of the boat to a point above the water level or by lowering all of the buoys on both sides of the vessel the displacement of the boat itself might be materially affected and raised relatively to the surface, or the sinking of the vessel prevented or retarded.

When not in use the buoys are elevated and supported from the davits 19 above the deck, but the cable 21 remains in permanent connection with the buoy to guide the same, and the lowering of the buoys is under the absolute control of the operator of the winch. Where a torpedo attack is anticipated the buoys could be lowered into the water to float upon the surface or to be drawn more or less beneath the surface, so that the impact of a torpedo might be received by the buoy.

The three cylinders are triangularly related and built together as a unit with the two small cylinders at the base of the triangle and with the large cylinder elevated above the smaller cylinders and with a space therebetween which becomes a water space whereby the steadying of the float is promoted the two legs of the triangle being on diverging lines to balance the float, and the triangular arrangement is of advantage in maintaining the float upright with the larger cylinder at the top.

What I claim is:

1. In safety devices for sea going vessels, a buoy adapted to float at the side of a vessel in sustaining relation and consisting of groups of buoyant cylinders rigidly connected, the said cylinders being arranged in approximately triangular form with the larger cylinder above and the two smaller cylinders on a plane beneath the same and relatively outward therefrom, and water tight webbing connecting said cylinders and forming an air pocket between them.

2. A buoy adapted to be suspended at the side of a vessel comprising a group of three cylinders triangularly related and secured together as a unit, the two lower cylinders being of the same size and the middle and upper cylinder of a larger size, and water tight webbing between each of the smaller and the larger cylinders and adapted to form an air pocket between them.

3. A buoy comprising one large and two small cylinders rigidly secured together by means of water tight webbing in triangular relation and with the smaller cylinders at the base of the triangle, said cylinders having pointed ends and subdivided transversely into separate compartments, and means to suspend and confine the buoy at the side of a vessel in submersed relation.

Signed at Cleveland, in the county of Cuyahoga, and State of Ohio, this 18th day of February, 1918.

MAX GREENBERG.

Copies of this patent may be obtained for five cents each, by addressing the "Commissioner of Patents, Washington, D. C."